(12) United States Patent
Matsue et al.

(10) Patent No.: US 10,983,222 B2
(45) Date of Patent: Apr. 20, 2021

(54) SATELLITE RADIOWAVE RECEIVING DEVICE, ELECTRONIC TIMEPIECE, METHOD FOR CONTROLLING POSITIONING OPERATIONS, AND STORAGE DEVICE

(71) Applicant: CASIO COMPUTER CO., LTD., Tokyo (JP)

(72) Inventors: Takeshi Matsue, Kokubunji (JP); Tatsuya Sekitsuka, Kunitachi (JP); Ryuji Shingyoji, Ome (JP)

(73) Assignee: CASIO COMPUTER CO., LTD., Tokyo (JP)

(*) Notice: Subject to any disclaimer, the term of this patent is extended or adjusted under 35 U.S.C. 154(b) by 332 days.

(21) Appl. No.: 16/103,197

(22) Filed: Aug. 14, 2018

(65) Prior Publication Data
US 2019/0094380 A1   Mar. 28, 2019

(30) Foreign Application Priority Data
Sep. 25, 2017   (JP) .............................. JP2017-183186

(51) Int. Cl.
*G01S 19/28* (2010.01)
*G01S 19/34* (2010.01)
*G01S 19/24* (2010.01)

(52) U.S. Cl.
CPC ............. *G01S 19/28* (2013.01); *G01S 19/24* (2013.01); *G01S 19/246* (2013.01); *G01S 19/34* (2013.01)

(58) Field of Classification Search
CPC ........ G01S 19/28; G01S 19/24; G01S 19/246; G01S 19/34
See application file for complete search history.

(56) References Cited

U.S. PATENT DOCUMENTS

| | | | |
|---|---|---|---|
| 2008/0188210 A1* | 8/2008 | Choi | ................... G09B 29/007 |
| | | | 455/414.3 |
| 2016/0245922 A1* | 8/2016 | Wu | ......................... G01S 19/46 |
| | | (Continued) | |

FOREIGN PATENT DOCUMENTS

| | | |
|---|---|---|
| EP | 1 792 200 A1 | 6/2007 |
| JP | 2014-066550 A | 4/2014 |
| | (Continued) | |

OTHER PUBLICATIONS

Extended European Search Report dated Feb. 1, 2019 received in European Patent Application No. EP 18195401.7.
(Continued)

*Primary Examiner* — Erin F Heard
*Assistant Examiner* — Donald H B Braswell
(74) *Attorney, Agent, or Firm* — Scully Scott Murphy & Presser

(57) ABSTRACT

A satellite radiowave receiving device includes a receiver and a processor. The receiver acquires and receives radiowaves from a positioning satellite. The processor performing a positioning operation based on the radiowaves received by the receiver to obtain a current position of the satellite radiowave receiving device. The processor causes the receiver to stop an acquiring operation of radiowaves from a new positioning satellite under a predetermined condition while radiowaves are being acquired from a required number of positioning satellite for the positioning operation. If an error range of the obtained current position no longer satisfies a predetermined accuracy standard during a stop of the acquiring operation, the processor causes the receiver to resume the acquiring operation.

18 Claims, 5 Drawing Sheets

(56) References Cited

U.S. PATENT DOCUMENTS

2017/0315240 A1* 11/2017 Farmer .................. G01S 19/24
2019/0018130 A1* 1/2019 Griggs .................... G01S 13/66

FOREIGN PATENT DOCUMENTS

JP      2017-167169 A    9/2017
WO        00/77538 A1   12/2000

OTHER PUBLICATIONS

Notice of Reasons for Refusal dated Aug. 6, 2019 in Japanese Patent Application No. 2017-183186.

* cited by examiner

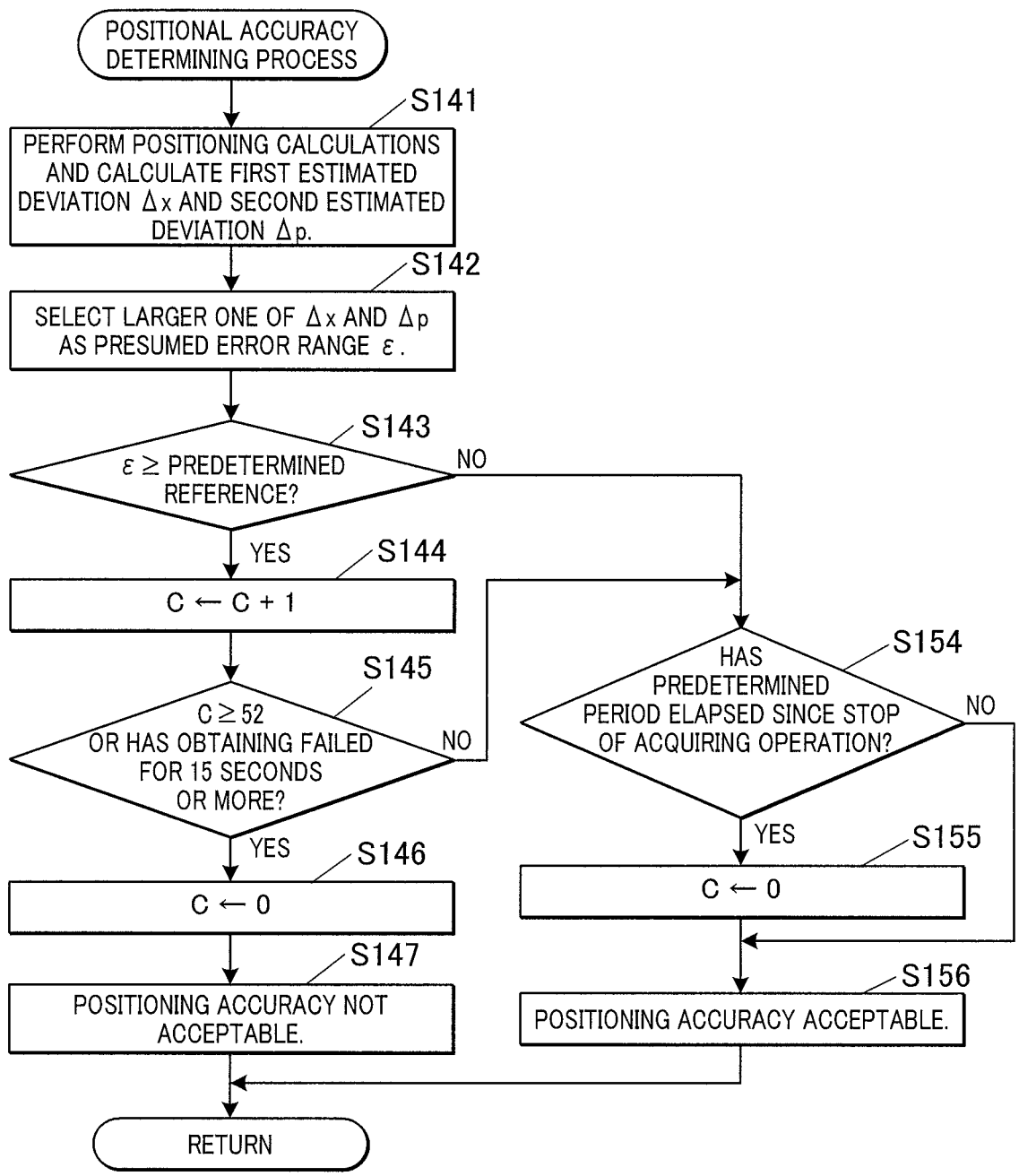

SATELLITE RADIOWAVE RECEIVING DEVICE, ELECTRONIC TIMEPIECE, METHOD FOR CONTROLLING POSITIONING OPERATIONS, AND STORAGE DEVICE

BACKGROUND

The present invention relates to a satellite radiowave receiving device, an electronic timepiece, a method for controlling positioning operations, and a storage device.

A satellite radiowave receiving device (positioning device) receives radiowaves containing positioning information from positioning satellites and performs positioning operations. The satellite radiowave receiving device can perform positioning operations at various countries and regions of the world based on the current positions of a plurality of positioning satellites and gaps in propagation time (pseud distance) of radiowaves transmitted from these positioning satellites.

In global navigation satellite systems, such as Global Positioning System (GPS) in the U.S.A and GLONASS in the Russia, the orbits of positioning satellites are determined such that radiowaves from approximately six positioning satellites can be always received on flat surfaces of the ground or the sea. Since power consumption in acquiring radiowaves from positioning satellites is larger than that in tracking positioning satellites, portable satellite radiowave receiving devices with a limited power consumption stops an acquiring operation when radiowaves from a required number of positioning satellites have been acquired.

However, a change in the position of a positioning satellite during a continuous positional operation makes it no longer possible to receive radiowaves from a positioning satellite, while making it possible to receive radiowaves from another positioning satellite. To cope with this situation, Japanese Unexamined Patent Application Publication No. 2014-66550 discloses techniques that enables stopping of an acquiring operation when the number of positioning satellites from which radiowaves are received is equal to or greater than a predetermined maximum number of positioning satellites, and resumption of the acquiring operation when the number of positioning satellites from which radiowaves are received is reduced to less than the minimum number of positioning satellites required for positioning.

However, the positioning accuracy depends on a spatial distribution of positioning satellites which is acquired and used for positioning calculations and on the receiving state of radiowaves from the positioning satellites. Determination of necessity for a re-acquiring operation solely based on the number of positioning satellites from which radiowaves are acquired precludes accurate positioning operations when the number of positioning satellites from which radiowaves are acquired is reduced to a number near the minimum number of positioning satellites.

SUMMARY

A satellite radiowave receiving device, an electronic timepiece, a method for controlling a positioning operations, and a storage device are disclosed.

According to a preferred embodiment, there is provided a satellite radiowave receiving device, including:

a receiver acquiring and receiving radiowaves from a positioning satellite; and a processor performing a positioning operation based on the radiowaves received by the receiver to obtain a current position of the satellite radiowave receiving device, wherein the processor causes the receiver to stop an acquiring operation of radiowaves from a new positioning satellite under a predetermined condition while radiowaves are being acquired from a required number of positioning satellite for the positioning operation, and if an error range of the obtained current position no longer satisfies a predetermined accuracy standard during a stop of the acquiring operation, the processor causes the receiver to resume the acquiring operation.

BRIEF DESCRIPTION OF THE DRAWINGS

FIG. 6 illustrates a procedure for controlling a process of determining positioning accuracy.

DETAILED DESCRIPTION OF THE INVENTION

An embodiment will now be described with reference to the drawings.

Figure 1:
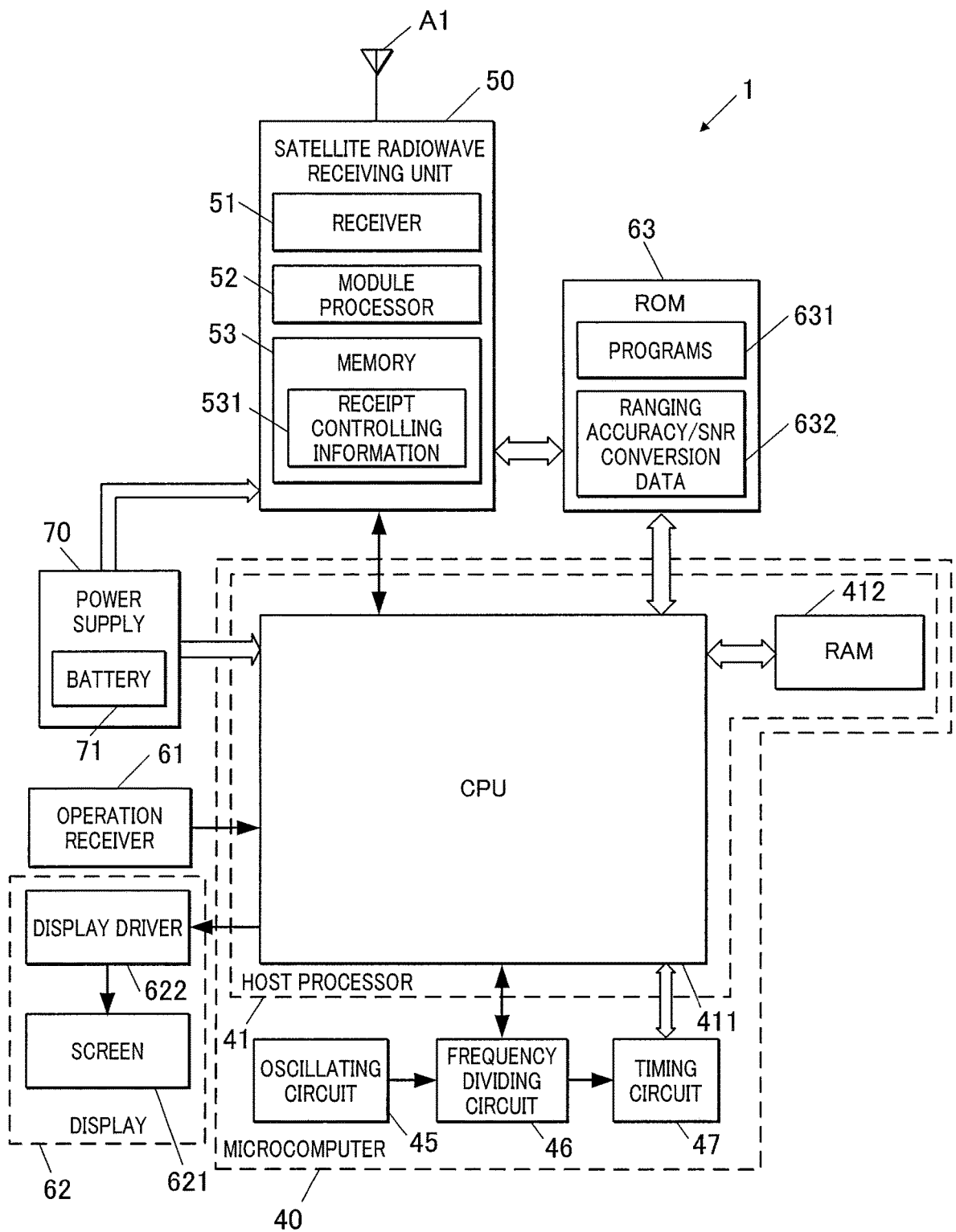
FIG. 1 is a block diagram illustrating a functional configuration of an electronic timepiece according to an embodiment of the present invention.

FIG. 1 is a block diagram illustrating a functional configuration of an electronic timepiece 1 according to one embodiment of the present invention.

An electronic timepiece 1 includes a microcomputer 40, a satellite radiowave receiving unit 50, an antenna A1, an operation receiver 61, a display 62, a read only memory (ROM) 63, a communication unit 64, and a power supply 70.

The microcomputer 40 performs various operations, such as control of the electronic timepiece 1, storage in memory, and counting of date and time. The microcomputer 40 includes a host processor 41, an oscillating circuit 45, a frequency dividing circuit 46, and a timing circuit 47.

The host processor 41 administers the overall operations of the electronic timepiece 1. The host processor 41 includes a central processing unit (CPU) 411 and a random access memory (RAM) 412.

The CPU 411 performs various calculations to control a normal display of date and time and operations relevant to the various functions of the electronic timepiece 1, such as alarm notification, timer, and stop watch functions. The CPU 411 also controls display and notification of the results of a positioning operation or a date and time obtaining operation performed by the satellite radiowave receiving unit 50.

The RAM 412 provides the CPU 411 with a working memory and stores temporary data. The temporary data includes information on time zone settings and local time settings (including daylight-saving time). The time zone settings are used to display the current date and time (local time) at a set position, such as the current position, in a region in the world. These local time settings may be updated in accordance with the current position information obtained through positioning operations. The RAM 412 may be external to the microcomputer 40. The RAM 412 may also include a rewritable non-volatile memory in addition to DRAM.

The oscillating circuit 45 generates and outputs a signal with a predetermined frequency of, for example, 32.768 kHz (clock signal). A crystal oscillator, for example, is used to generate clock signals. The crystal oscillator may be external to the microcomputer 40. The frequency of the clock signals output from the oscillating circuit 45 may contain offset errors within an allowable range for the electronic timepiece 1. The frequency of the clock signals varies, depending on an external environment, primarily temperatures.

The frequency dividing circuit 46 frequency-divides the clock signals input from the oscillating circuit 45 into frequency-division signals with a predetermined frequency division ratio, and outputs the frequency-division signals. The frequency division ratio may be varied by the CPU 411.

The timing circuit 47 counts signals with a predetermined frequency input from the frequency dividing circuit 46, which may be identical to that of the clock signals, to obtain and retain the current date and time. The accuracy of the date and time obtained by the timing circuit 47 depends on the accuracy of the clock signals from the oscillating circuit 45, i.e., the above-mentioned offset errors and the degree of variations in the frequency of the clock signals. The date and time obtained by the timing circuit 47 may deviate from an accurate date and time. The CPU 411 can modify the counted date and time based on the current date and time obtained by the satellite radiowave receiving unit 50.

The satellite radiowave receiving unit 50 is a satellite radiowave receiving device according to an embodiment of the present invention. The satellite radiowave receiving unit 50 can receive radiowaves transmitted from a positioning satellite in a global navigation satellite system (GNSS), such as Global Positioning System (GPS) of the U.S.A. The satellite radiowave receiving unit 50 processes the received radiowaves to obtain information on the current date and time and the current position. In response to a request of the host processor 41 (CPU 411), the satellite radiowave receiving unit 50 outputs requested information in a predetermined format to the host processor 41. The satellite radiowave receiving unit 50 includes a receiver 51, a module processor 52, and a memory 53.

The receiver 51 receives radiowaves transmitted from a target positioning satellite. In the receiving operation, the receiver 51 acquires (or detects) the radiowaves transmitted from the positioning satellite and identifies the positioning satellite and the phase of signals in the transmitted radiowaves (a navigation message). The receiver 51 tracks the radiowaves transmitted from the positioning satellite based on the identification information on the acquired positioning satellite and the phase, and continuously demodulate and receive the signals.

The module processor 52 includes a CPU and a RAM and controls the various operations of the satellite radiowave receiving unit 50. In response to an instruction of the host processor 41, the module processor 52 causes the receiver 51 to receive radiowaves from a positioning satellite at an appropriate timing, obtains necessary information from the received radiowaves, and performs various calculations for positioning to obtain the current date and time (date and time information) and the current position of the electronic timepiece 1 (the satellite radiowave receiving device). The module processor 52 may be provided with a dedicated hardware circuit for various calculations. The results of the positioning may be output in a common format, such as NMEA-0183 (National Marine Electronics Association), or in a format specific to the electronic timepiece 1. The data output by the hardware circuit in a predetermined format may be processed as needed and output by the CPU. The RAM is provided on a substrate of a control chip of the module processor 52. Alternatively, the RAM may be external to the control chip. The module processor 52 can calculate a signal-to-noise (SNR) ratio of radiowaves from each positioning satellite (similar to a C/N ratio), the position and dilution of precision (DOP) of each positioning satellite, and a travelling speed from the current position when the current date and time and current position are obtained.

The memory 53 stores receipt controlling information 531, such as various parameters and received information, and control programs executed by the module processor 52 in the satellite radiowave receiving unit 50. Examples of the parameters include format data for navigation messages from each positioning satellite. The received information includes, for example, predicted orbit information (almanac) and precise orbit information (ephemeris), which are obtained from each positioning satellite. The memory 53 is a non-volatile memory and may be external to a control chip (a substrate) of the module processor 52.

The operation receiver 61 receives external input operations, such as a user operation. The operation receiver 61 includes a push-button switch and a winding crown. In response to a pressing operation of the push-button switch or a pulling-out, rotating, or pushing-back operation of the winding crown, the operation receiver 61 outputs a corresponding operational signal to the CPU 411 of the host processor 41. Alternatively, the operation receiver 61 may include a touch sensor.

The display 62 shows various pieces of information in accordance with the control of the host processor 41. The display 62 includes a display driver 622 and a screen 621. The screen 621 displays digital information on a liquid crystal display (LCD) of a segment, dot-matrix or combination type. Alternatively, the display 62 may be configured to show information with needles and a stepping motor that rotates the needles, instead of the digital display on the display screen 621. In response to a control signal from the CPU 411, the display driver 622 outputs a drive signal on the display screen 621 to show information on the display screen 621. The information appearing on the display 62 includes the date and time information (in particular, the current date and time) obtained from the date and time counted by the timing circuit 47, and date and time settings, set time, and measured time for the alarm notification, timer and stop watch functions. Information on the current position obtained through a positioning operation and local time settings can also be displayed.

The ROM 63 stores programs 631 and initial setting data. The programs 631 are for the host processor 41 and the module processor 52 to perform control operations. The ROM 63 may store a non-volatile memory, such as a rewritable and updatable flash memory, in addition to or in place of a mask ROM. The ROM 63 is read- and write-accessible by the host processor 41 and the module processor 52 and detachable from a mount portion, such as a slot.

The programs 631 include control programs for obtaining the current time and date and/or positioning operations. The ROM 63 contains ranging accuracy/SNR conversion data 632 that indicates the correspondence relation between the strength of radiowaves received by the satellite radiowave receiving unit 50 and the ranging accuracy corresponding to the strength of received radiowaves, i.e., the accuracy of the measured distance from a positioning satellite to the electronic timepiece 1 (the satellite radiowave receiving device). The ranging accuracy/SNR conversion data 632 may be in the form of a table of the correspondence between SNRs and ranging accuracies, or a formula or approximation formula, for calculating the ranging accuracy from a SNR. The ranging accuracy/SNR conversion data 632 may be stored in the memory 53 of the satellite radiowave receiving unit 50.

The power supply 70 supplies power from a battery 71 to various units of the electronic timepiece 1, such as microcomputer 40 and the satellite radiowave receiving unit 50, at a predetermined drive voltage. The supply or non-supply of power to the satellite radiowave receiving unit 50 can be controlled separately from power supply to the microcomputer 40 under the control of the host processor 41. The battery 71 is a replaceable dry-cell battery or a rechargeable battery and may include solar panels and an electricity charging (storing) unit.

The positioning operation of the electronic timepiece 1 according to this embodiment will now be described.

The satellite radiowave receiving unit 50 of the electronic timepiece 1 receives radiowaves from a plurality of (for example, four or more) positioning satellites to obtain navigation messages. The electronic timepiece 1 performs positioning calculations based on the received navigation messages and the timing to receive the navigation messages. In the case of continuous repeated positioning operations, the electronic timepiece 1 obtains the results of the positioning operation every second. In the positioning calculations, the electronic timepiece 1 calculates the accuracy of results of the positioning operation, i.e., an error range of the current position. If the error range is greater than a predetermined reference range, i.e., if the accuracy is lower, the electronic timepiece 1 performs a re-acquiring operation so that navigation messages in radiowaves from more positioning satellites are available for positioning calculations.

A navigation message received from each of four or more positioning satellites contains an ephemeris. In the positioning calculations, as is commonly known, the current position of each satellite based on the ephemeris and a difference in the timing to receive the navigation message from each positioning satellite (pseudo range) are used to obtain four unknowns, i.e., three components of the current position of electronic timepiece 1 and a component of the current time and date. This calculation is performed by an iterative calculation (successive approximation), for example, the Newton-Raphson method (Newton's method). The iterative calculation involves a numerical convergence of a predetermined initial value to an unknown value.

In the calculation of the accuracy of the results of positioning, an error range is calculated by each of two methods of calculating the accuracy described below in consideration of a gap between the current position and a predicted position, and a more appropriate error range is selected from these two calculated error ranges. The "more appropriate" indicates simply a larger error range, i.e., a lower accuracy, to cover the largest error range that can be expected. The above-mentioned predicted position is obtained based on a positional relation among a plurality of positioning satellites from which radiowaves are received, the state of radiowaves received from each positioning satellite, and the moving state (travelling state) of the electronic timepiece 1 (the satellite radiowave receiving device).

Figure 2:
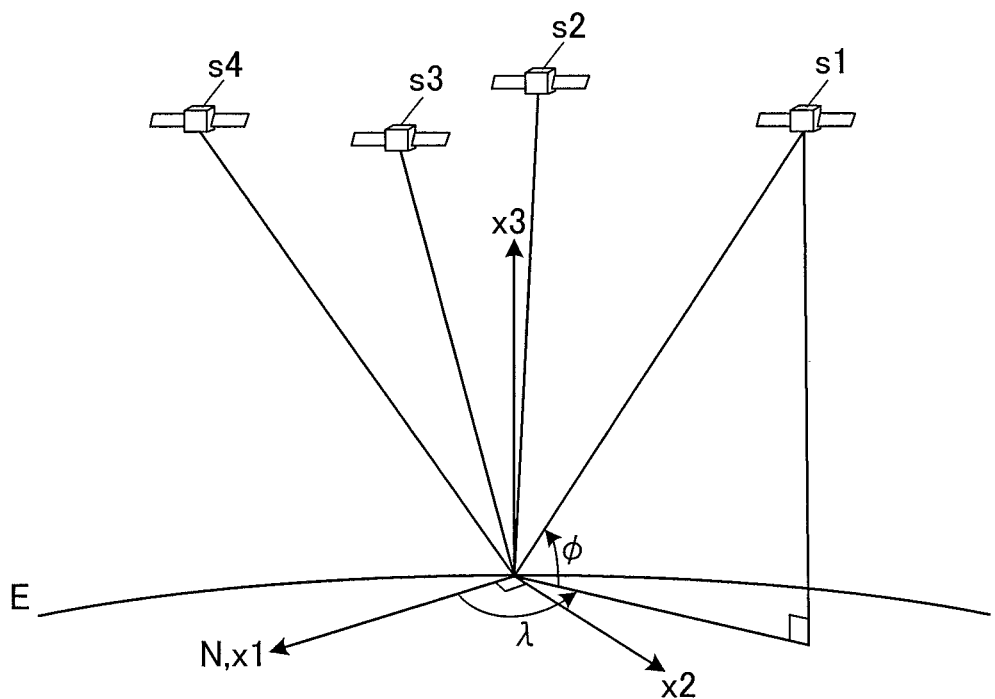
FIG. 2 illustrates a first method of calculating accuracy on the results of a positioning operation.

FIG. 2 illustrates a first method of calculating the accuracy of the electronic timepiece 1 according to this embodiment.

In the first method of calculating the accuracy, a first error range is calculated based on the state of radiowaves received from positioning satellites.

For a positioning satellite from which radiowaves can be received, its relative direction to the current position is determined with an elevation angle $\Phi$ and an azimuth angle A. The elevation angle $\Phi$ is an angle between the line connecting the current position and the positioning satellite and a horizontal plane E; a direction $x_3$ is perpendicular to the horizontal plane E. The azimuth angle $\lambda$ is an angle between the component on the horizontal plane E of the line connecting the current position and the positioning satellite and the north pole direction N; the north pole direction N is defined by the direction $x_1$ and the direction perpendicular to the direction $x_1$ on the horizontal plane E is defined by a direction $x_2$. A more appropriate distribution of a plurality of positioning satellites from which radiowaves are received results in obtaining more accurate three components of the current position and a more accurate time component. In other words, an uneven distribution of a plurality of positioning satellites with respect to the current position results in a lower positioning accuracy.

The dilution of precision (DOP) used to evaluate a positioning accuracy is represented by $D=A^T \cdot A$ on a matrix A $(\chi)$ of n rows and 4 columns that consists of three directional components $(x_{ij}, j=1$ to 3) relative to the current position of each positioning satellite $s_i$ (i=1 to n, n represents the number of positioning satellites used for positioning) and a time component $(x_{i4}, x_{i4}=1)$, i.e., the diagonal component of the inverse matrix $D^{-1}=U$ of the matrix D of four rows and four columns having j and k components which are expressed with $D_{jk}=\Sigma_{(i=1-n)}(x_{ij} \cdot \chi_{ik})$. This indicates that DOP solely depends on the position of each positioning satellite $s_i$. These three directional components having a vector length of 1 can be calculated with $(x_{i1}, x_{i2}, x_{i3})=(\cos \lambda_i \cdot \cos \Phi_i, \sin \lambda_i \cdot \cos \Phi_i, \sin \Phi_i)$. HDOP, a horizontal DOP, is expressed by $(|u_{11}|+|u_{22}|)^{1/2}$ using diagonal components $u_{ii}$ of the matrix U; VDOP, a vertical DOP, is expressed by $(|u_{33}|)^{1/2}$; PDOP, a positional DOP, is expressed by $(\Sigma_{(i=1 \text{ to } 3)}|u_{ii}|)^{1/2}$. These DOP values are approximately 1 under the best conditions; greater values indicate a lower accuracy.

However, in fact, the distribution of the positioning satellites with lower DOP values increases a difference in angle among the positioning satellites viewed from the current position, which normally results in inclusion of a positioning satellite having a small elevation angle $\Phi_i$. Meanwhile, smaller elevation angle $\Phi_i$ tends to result in reduced strength of the received radiowaves. The first method of calculating the accuracy of the electronic timepiece 1 according to this embodiment involves weighting of a variance in relative position of each positioning satellite with the corresponding SNR based on a combination of the position of each positioning satellite (a relative position with respect to the current position) and the ranging accuracy corresponding to the strength of received radiowaves from the each positioning satellite.

Figure 3:
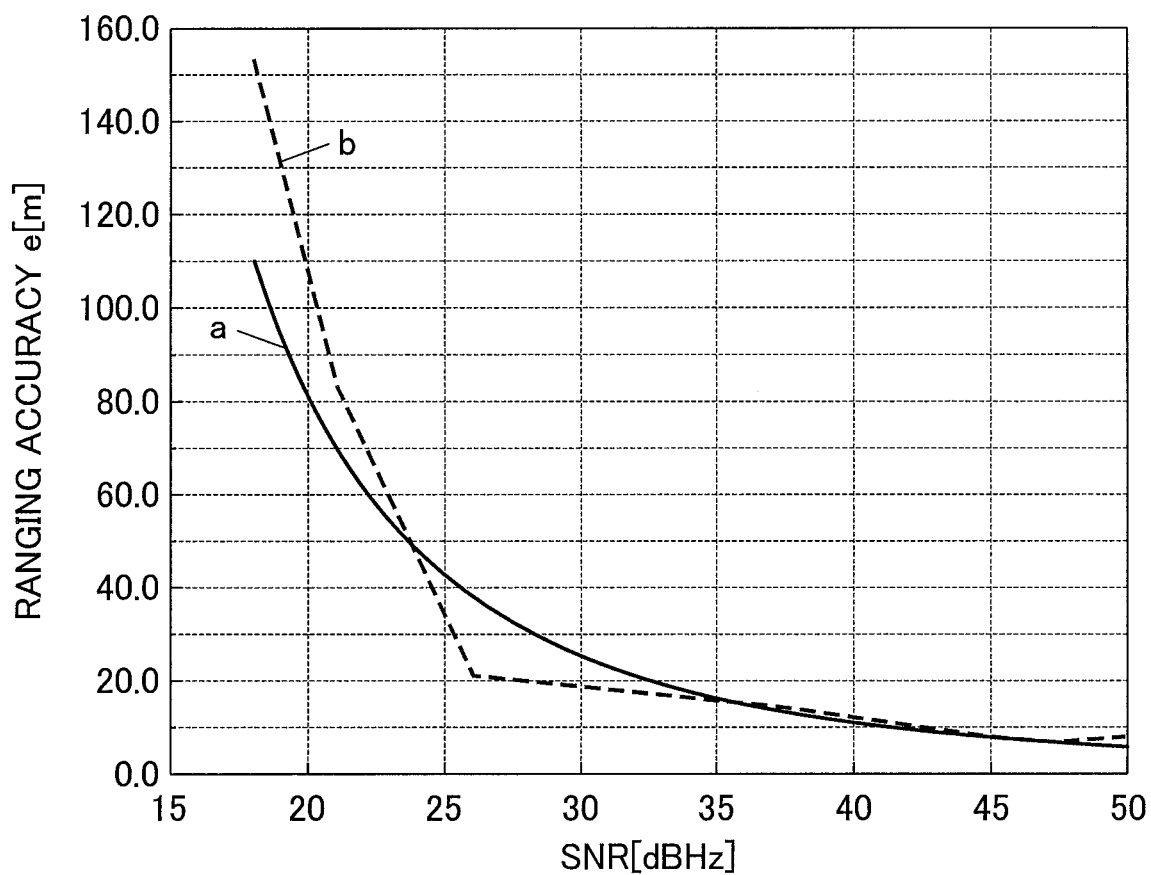
FIG. 3 illustrates a relation between a signal-to-noise ratio (SNR) of radiowaves received from a positioning satellite and a ranging accuracy for the positioning satellite from which radiowaves are received at the SNR.

FIG. 3 illustrates a relation between a SNR of radiowaves received from a positioning satellite and a ranging accuracy for the positioning satellite from which radiowaves are received at the SNR.

As a SNR [dBHz] reduces, the accuracy for determining a pseudo range (a ranging accuracy $e_i$ [km]) also deteriorates (the value increases), i.e., the maximum deviation expected at a position obtained through positioning increases. As shown by the solid line (a) in FIG. 3, the ranging accuracy $e_i$ improves (its value decreases) in accordance with an exponential function, as the SNR increases. This relation is stored as the ranging accuracy/SNR conversion data 632 in the ROM 63 before shipment of the product in the form of table data obtained based on measurements (or examination) or a calculating formula. In the case where the ranging accuracy/SNR conversion data 632 is in the form of table data, the ranging accuracy $e_i$ corresponding to the intermediate value among the SNR values in the table may be calculated through interpolation. In the case where the ranging accuracy/SNR conversion data 632 in the form of calculating formula, the calculating formula may be an approximation formula provided that required accuracy is retained. The calculating formula may be simply expressed by a combination of several straight lines, for example, as shown by the broken line (b) in FIG. 3.

As described above, radiowaves are received from a plurality of positioning satellites to perform positioning operations. A combination of SNRs or ranging accuracies $e_i$ of positioning satellites causes a variation in the maximum deviation that may be included in the final results of the positioning operation. Here, the first error range is calculated as follows: Each element $(x_{ij} \cdot x_{ik})$ of each component $D_{jk} = \Sigma_{(i=1\ to\ n)} (x_{ij} \cdot x_{ik})$ of the matrix D is weighted with the ranging accuracy $e_i$ corresponding to the SNR for each positioning satellite $s_i$, i.e., with $e_i^{-2}$. Using the weighting matrix W of n rows and n columns having diagonal components $sw_{ii}$ set to $e_i^{-2}$ ($w_{ii} = e_i^{-2}$) and having all non-diagonal components set to "0", the positioning accuracy weighted with a receiving strength by the inverse matrix $D^{-1} = U$ of the matrix $D = A^T \cdot W \cdot A$ (each component $D_{jk} = \Sigma_{(i=1\ to\ n)} (x_{ij} \cdot w_{ii} \cdot x_{ik})$) is calculated as a first expected deviation $\Delta x$ (a first error range). As descried above, the DOP values under the best conditions are approximately 1. The first estimated deviation $\Delta x$ is in the same order as that of the square root of the square of a ranging accuracy $e_i$, i.e., the same order as that of the ranging accuracy $e_i$. Alternatively, the first estimated deviation $\Delta x$ may be suitably multiplied by a predetermined factor.

As described above, the first estimated deviation $\Delta x$ calculated by the first method of calculating the accuracy is obtained directly from the receiving strength and the distribution of positioning satellites.

Figure 4:
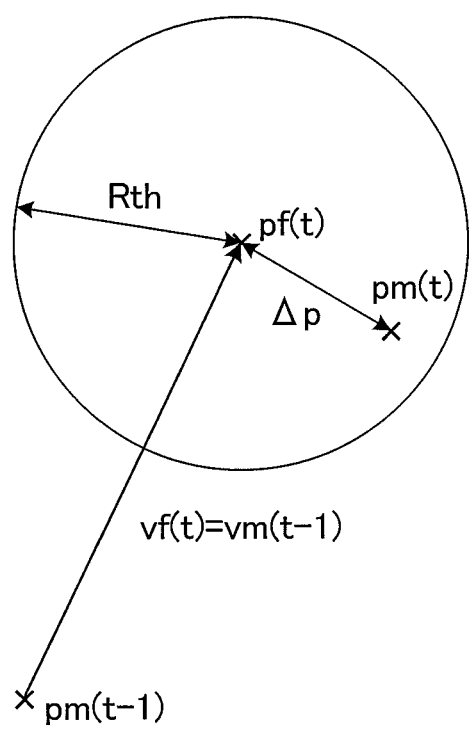
FIG. 4 illustrates a second method of calculating the accuracy on the results of a positioning operation.

FIG. 4 illustrates a second method of calculating the accuracy of the electronic timepiece 1 according to this embodiment.

In the second method of calculating the accuracy, a second error range is determined based on a deviation between a predicted position and the current position.

After obtaining positional information several (at least two) times, the travelling speed of the electronic timepiece 1 (the satellite radiowave receiving device) can be calculated based on the changes of positions. In the case where no large acceleration is generated, the next calculated position reached after travelling from the last position (calculated position) at this travelling speed can be predicted. Comparison of this predicted position with the next calculated position can obtain a deviation in the result of the positioning operation. Let a predicted speed of (t) be equal to the last measured speed vm (t−1). The last measured speed vm (t−1) is obtained by dividing a difference between calculated positions pm(t−1) and pm(t−2), which are the calculated results of the last two positioning operations, by a difference $\Delta t$ in time between the last two positioning operations. The predicted speed vf(t) can be calculated as follows: vf(t)=vm (t−1)=(pm(t−1)−pm(t−2))/$\Delta t$.

The predicted speed of (t), which is obtained as shown above, is used to obtain a predicted position pf(t) as follows: pf(t)=pm(t−1)+vf(t)·$\Delta t$. The deviation between the predicted position pf(t) and the calculated position pm(t) represents a second estimated deviation $\Delta p$ (second error range), which is calculated as follows: $\Delta p$=|pf(t)−pm(t)|.

Instead of calculation of a predicted position pf(t) using the last calculated position pm(t−1), a more likely presumed position pe(t−1) may be obtained using the calculated position pm(t−1) and the last predicted position pf(t−1) to calculate a predicted position pf(t) as follows: pf(t)=pe (t−1)+vf(t)·$\Delta t$. The presumed position pe(t−1) may be obtained by an appropriate means, for example, Kalman filter. Even if the Kalman filter is not used, the presumed position pe (t) can be obtained by weighing the predicted position and the calculated position properly in accordance with the deviation therebetween, like Kalman filter's error covariance matrix.

Alternatively, in the calculation of the predicted position pf(t), acceleration may be considered based on a difference between speeds. Alternatively, if a travelling speed in the direction of the line connecting a positioning satellite and the electronic timepiece can be measured as a variation in frequency due to the Doppler effect based on the positional relation between the positioning satellite and the electronic timepiece, the travelling speed may be calculated based on the variation in frequency. Alternatively, not only the last two (or three, if acceleration is generated) calculated positions but also the historical information of positions may be statistically processed to find a travelling tendency.

In the second method of calculating the accuracy, deviation between the current position predicted based on speeds and their history and the actually calculated position and the impact of the deviation may be considered.

The electronic timepiece 1 according to this embodiment further compares a first estimated deviation $\Delta x$ and a second estimated deviation $\Delta p$ and selects a greater one as a presumed error range $\varepsilon$ (an error range at the current position). The electronic timepiece 1 determines whether the presumed error range $\varepsilon$ is greater (wider) than a predetermined reference Rth, and determines whether the results of the positioning operation is acceptable or not based on the results of determination on the presumed error range $\varepsilon$, in other words, whether the positioning accuracy is acceptable or not. The predetermined reference Rth may be fixed (for example, 20 m) or varied in accordance with application to which the positional information is output or in accordance with application settings. The application settings may be changed through a predetermined input operation received by the operation receiver 61 or through a setting request of an application program being executed.

In the case of continuous and repeated positioning operations, the satellite radiowave receiving unit 50 stops the acquiring operation if radiowaves enough to perform positioning operations have been acquired from positioning satellites at the end of an initial acquiring operation. The satellite radiowave receiving unit 50 continues to track the radiowaves which have been acquired for positioning operations. If a positioning accuracy is reduced to a level that no longer meets a predetermined accuracy standard during the stop of the acquiring operation, the satellite radiowave receiving unit 50 resumes the acquiring operation to obtain more radiowaves from the acquired positioning satellites. In the resumed acquiring operation, the radiowaves from the positioning satellites which have been acquired need not be acquired.

Figure 5:
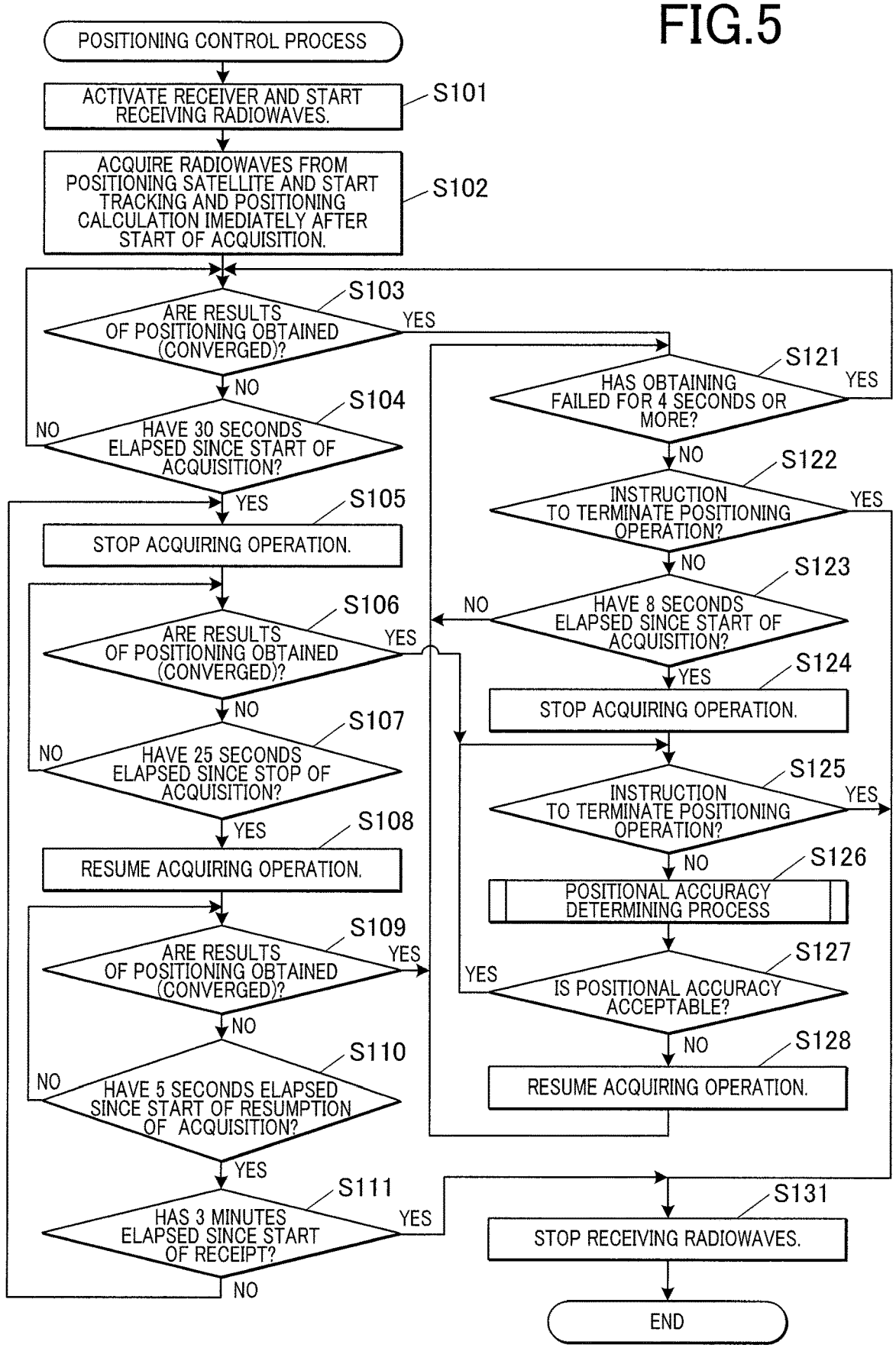
FIG. 5 illustrates a procedure for controlling a positioning process.

FIG. 5 is a flowchart illustrating a procedure performed by the module processor 52 for controlling the positioning process in the electronic timepiece 1 according to this embodiment.

The positioning control process starts in response to a positioning command from the host processor 41.

At the start of the positioning control process, the module processor 52 activates the receiver 51 to start receiving radiowaves from positioning satellites (Step S101).

The module processor 52 causes the receiver 51 to start an acquiring operation of radiowaves from positioning satellites and sequentially track the acquired radiowaves. The module processor 52 starts a positioning calculation immediately after radiowaves required for acquiring have been acquired from four or more positioning satellites (Step S102).

The module processor 52 determines whether the results of the positioning operation of the first current position has been obtained in the positioning calculation, which started after radiowaves had been acquired from four or more positioning satellites (Step S103). In other words, the module processor 52 determines whether the current position calculated by a successive approximation has converged properly, as shown above. If it is determined that the current position has been obtained ("YES" at Step S103), the module processor 52 proceeds to Step S121; if it is determined that the current position has not been obtained ("NO" at Step S103), the module processor 52 determines whether 30 seconds have elapsed since the start of the acquiring operation (Step S104). If it is determined that 30 seconds have not elapsed ("NO" at Step S104), the module processor 52 returns the process to Step S103.

If it is determined that 30 seconds have elapsed since the start of the acquiring operation ("YES" at Step S104), the module processor 52 causes the receiver 51 to stop the acquiring operation (Step S105). The module processor 52 causes the receiver 51 to continuously track the positioning satellites which have been acquired, and to determine whether the first current position has been obtained through the positioning calculation based on obtained navigation messages (Step S106). If it is determined that the first current position has been obtained ("YES" at Step S106), the module processor 52 proceeds to Step S125; otherwise ("NO" at Step S106), the module processor 52 determines whether 25 seconds have elapsed since the stop of the acquiring operation (Step S107).

If it is determined that 25 seconds have not elapsed ("NO" at Step S107), the module processor 52 returns the process to Step S106. If it is determined that 25 seconds have elapsed ("YES" at Step S107), the module processor 52 causes the receiver 51 to resume the acquiring operation (Step S108). The module processor 52 determines whether the first current position have been obtained through the positioning calculation (Step S109). If it is determined that the first current position has been obtained ("YES" at Step S109), the module processor 52 proceeds the process to Step S121.

If it is determined that the first current position has not been obtained ("NO" at Step S109), the module processor 52 determines whether five seconds have elapsed since the resumption of the acquiring operation (Step S110). If it is determined that five seconds have not elapsed ("NO" at Step S110), the module processor 52 returns the process to Step S109. If it is determined that five seconds have elapsed ("YES" at Step S110), the module processor 52 determines whether three minutes have elapsed since the start of the receiving operation (Step S111). If it is determined that three minutes have not elapsed ("NO" at Step S111), the module processor 52 returns the process to Step S105.

If it is determined that three minutes have elapsed since the start of the receiving operation ("YES" at Step S111), the module processor 52 causes the receiver 51 to stop the receiving operation of radiowaves (Step S131) and terminates the positioning control process.

After determination that the first current position has been obtained at either Step S103 or S109, the process proceeds to Step S121. The module processor 52 subsequently determines whether the positioning operation has failed to be obtained for four seconds or more (or four times consecutively) (Step S121). If it is determined that the positioning operation has failed to be obtained for four seconds or more ("YES" at Step S121), the module processor 52 proceeds the process to Step S103.

If the results of the positioning operation has not failed to be obtained for four seconds or more, in other words, the last positioning operation was successful or the number of failures is three or less ("NO" at Step S121), the module processor 52 determines whether a positioning termination instruction has been obtained or not (Step S122). The positioning termination instruction is sent from the host processor 41 when the host processor 41 has detected a predetermined input to the operation receiver 61 or when power supplied from the power supply 70 is lower than a predetermined level and the power supply 70 is substantially in the battery-running-down state. If it is determined that the positioning termination instruction has been obtained ("YES" at Step S122), the module processor 52 proceeds to Step S131.

If it is determined that the positioning termination instruction has not been obtained ("NO" at Step S122), the module processor 52 determines whether eight seconds have elapsed since the start of the acquiring operation currently under progress (Step S123). If it is determined that eight seconds have not elapsed ("NO" at Step S123), the module processor 52 returns the process to Step S121. If it is determined that eight seconds have elapsed since the start of the acquiring operation, which is a predetermined condition for stopping the acquiring operation ("YES" at Step S123), the module processor 52 causes the receiver 51 to stop the acquiring operation (Step S124). The Steps S123 and S124 constitute an acquisition stopping step in the positioning control according to this embodiment (an acquisition stopping means in the programs). The module processor 52 proceeds the process to Step S125.

At Step S125, the module processor 52 determines whether a positioning termination instruction has been obtained or not (Step S125). If it is determined that a positioning termination instruction has been obtained ("YES" at Step S125), the module processor 52 proceeds the process to Step S131; if it is determined that a positioning termination instruction has not been obtained ("NO" at Step S125), the module processor 52 calls and executes a positioning accuracy determining process (Step S126). The module processor 52 determines whether a positioning accuracy is acceptable or not in the positioning accuracy determining process (Step S127). If it is determined that the positioning accuracy is acceptable ("YES" at Step S127), the module processor 52 returns the process to Step S125; if it is determined that the positioning accuracy is not acceptable ("NO" at Step S127), the module processor 52 causes the receiver 51 to resume the acquiring operation (Step S128). The processes in Steps S126 to S128 constitute an acquisition resuming step in the method of controlling the positioning according to this embodiment (an acquisition resuming means in the programs). The module processor 52 returns the process to Step S121.

FIG. 6 is a flowchart illustrating a procedure for controlling the positioning accuracy determining process called from the positioning control process.

After the positioning accuracy determining process is called, the module processor 52 performs positioning calculations (the positioning calculating step or means) and calculates the first estimated deviation $\Delta x$ and the second estimated deviation $\Delta p$ based on the results of the positioning calculations (Step S141). The module processor 52 selects a larger one of the first estimated deviation $\Delta x$ or the second estimated deviation $\Delta p$ as a presumed error range $\varepsilon$ (Step S142).

The module processor 52 determines whether the presumed error range $\varepsilon$ is equal to or greater than the predetermined reference Rth (Step S143). If it is determined that the presumed error range $\varepsilon$ is not equal to or greater than the predetermined reference Rth, i.e. the presumed error range $\varepsilon$ is less than the predetermined reference Rth ("NO" at Step S143), the module processor 52 proceeds the process to Step S154; if it is determined that the presumed error range $\varepsilon$ is equal to or greater than the predetermined reference Rth ("YES" at Step S143), the module processor 52 adds 1 to a count c (Step S144).

The module processor 52 determines whether the count c is equal to or greater than 52 or the current position has failed to be obtained for 15 seconds (times) or more (Step S145). If it is determined that the count c is not equal to or greater than 52 (i.e., less than 52) and that the current position has not failed to be obtained for 15 seconds or more ("NO" at Step S145), the module processor 52 proceeds the process to Step S154. If it is determined that the count c is equal to or greater than 52, which is a predetermined accuracy standard for resuming the acquiring operation, or that the current position has failed to be obtained for 15 seconds or more ("YES" at Step S145), the module processor 52 resets the count c to zero (Step S146), determines that the positioning accuracy is not acceptable (at Step S147), terminates the positioning accuracy determining process, and returns the process to the positioning control process.

After the module processor 52 proceeds the process from Step S143 or S145 (determination step) to Step S154, the module processor 52 determines whether or not it is a timing when a predetermined period (a first reference period) has elapsed since the stop of the acquiring operation, for example, 2 minutes (120 seconds) (Step S154). If it is determined that it is a timing when the predetermined period has elapsed ("YES" at Step S154), the module processor 52 initializes the count c to zero (Step S155), determines that the positioning accuracy is acceptable (Step S156), terminates the positioning accuracy determining process, and returns the process to the positioning control process. If it is determined that it is not a timing when the predetermined period has elapsed ("NO" at Step S154), the module processor 52 proceeds the process to Step S156.

In other words, in the electronic timepiece 1 according to this embodiment, the acquiring operation is resumed based on an accuracy standard of 52 seconds or 15 failures. More specifically, when a low-accuracy state having a presumed error range $\varepsilon$ equal to or greater than the reference Rth lasts for 52 seconds or more in the first reference period (two minutes) or when the current position has failed to be obtained 15 times or more. In the former case, a first rate is calculated as 52/120. In the latter case, a failure rate is calculated by dividing the number of failures by the number of positioning operations performed in the first reference period of 120 seconds, i.e., by 120 times, and a second rate is calculated as 15/120. The reference period of 52 seconds and the reference number of operations of 15 may be changed as needed. Alternatively, the accuracy standard may be limited to 15 consecutive failures in obtaining the current position, instead of the number of failures at any timing in two minutes.

As described above, the satellite radiowave receiving unit 50 according to this embodiment includes the receiver 51 which acquires and receives radiowaves from positioning satellites and the module processor 52 which performs positioning operations based on radiowaves received by the receiver 51 to obtain the current position of the electronic timepiece. The module processor 52 causes the receiver 51 to stop the acquiring operation of radiowaves from a new positioning satellite after the elapse of eight seconds from the start of the acquiring operation (a predetermined condition) if radiowaves are acquired from a required number (four) of positioning satellites for positioning operations. If the presumed error range $\varepsilon$ at the obtained current position is greater than the reference Rth for 52 seconds or more in 120 seconds during the stop of the acquiring operation, the module processor 52 determines that the predetermined accuracy standard is not satisfied and causes the receiver 51 to resume the acquiring operation.

The electronic timepiece 1 according to this embodiment does not determine the necessity for acquiring more radiowaves based on the number of acquired positioning satellites only or does not perform regular acquiring operations regardless of the receiving state, as described above. Instead, the electronic timepiece 1 resumes the acquiring operation, depending on the positioning accuracy, to maintain a necessary accuracy while performing the minimum necessary number of acquiring operations. This leads to effective positioning operations without an increase in power consumption more than necessary. Accordingly, the satellite radiowave receiving unit 50 can continue to perform high-accuracy positioning operations effectively.

The module processor 52 causes the receiver 51 to resume the acquiring operation when the rate of low-accuracy periods in which a presumed error range $\varepsilon$ is greater than the reference Rth in the first reference period (for example, two minutes) is equal to or greater than the predetermined first rate (for example, 52/120), which is an accuracy standard.

The electronic timepiece 1 according to this embodiment counts the number in the predetermined period, instead of resuming the acquiring operation each time in response to a temporary reduction in accuracy due to travel, as described above. The electronic timepiece 1 according to this embodiment does not consider a receiving state that had occurred long time ago since it is irrelevant to the current receiving state. This prevents the satellite radiowave receiving unit 50 from performing acquiring operations more than necessary and consuming power more than necessary. In addition, the electronic timepiece 1 simply compares a value at each second in the two minutes with a reference value and adds 1 to a counter. This eliminates the necessity to continuously store a large amount of data and facilitates the process.

The module processor 52 causes the receiver 51 to resume the acquiring operation when a rate of failures to obtain the current position within the first reference period (two minutes) is equal to or greater than the second rate (15/120), which is less than the first rate (52/120).

This allows the satellite radiowave receiving unit 50 to resume the acquiring operation more quickly in the case of positioning failures than in the case of a reduced accuracy to obtain the current position. This ensures a more stable continuous positioning.

The module processor 52 calculates a presumed error range $\varepsilon$ at the current position in consideration of the first estimated deviation $\Delta x$ and the deviation $\Delta p$ between the obtained current position pm and a predicted position pf. The first estimated deviation Δx is obtained based on a combination of each of the positions of positioning satellites and each of the receiving states of radiowaves received from the positioning satellites. The deviation Δp is calculated based on the traveling state of the electronic timepiece 1 (the satellite radiowave receiving unit 50).

The electronic timepiece 1 according to this embodiment considers not only the distribution of positioning satellites (DOP) but also the strength of radiowaves received from each positioning satellite in the calculation of a presumed error range ε, as described above, and further performs a multidimensional evaluation using the predicted positions. This allows the satellite radiowave receiving unit 50 to continuously perform more appropriate and stable positioning operations that are less likely to cause a significant deviation.

The module processor 52 calculates the first estimated deviation Δx for positioning accuracy and the second estimated deviation Δp based on deviation between the predicted position pf and the current position pm. The module processor 52 calculates a presumed error range ε at the current position based on the first estimated deviation Δx and the second estimated deviation Δp. The module processor 52 considers several error causes and, in particular, the impact of a receiving strength on errors properly, as shown above. This allows the satellite radiowave receiving unit 50 to obtain a more appropriate range of error.

The module processor 52 selects a larger one of the first estimated deviation Δx and the second estimated deviation Δp, as a presumed error range ε at the current position. Such a simple process facilitates presumption of the largest error and prevents the underestimation of deviation. This allows the satellite radiowave receiving unit 50 to resume acquiring operation properly when needed to maintain accuracy.

The electronic timepiece 1 according to this embodiment includes the ROM 63 (or the memory 53) which stores the correspondence relation between the strength of radiowaves received from a positioning satellite and the ranging accuracy $e_i$ of the positioning satellite based on the strength of radiowaves from the positioning satellite. The module processor 52 calculates the first estimated deviation Δx based on a combination of a relative position x of each of the positioning satellites with respect to the current position, which are used to calculate the current position, and a ranging accuracy $e_i$ corresponding to the strength of radiowaves received from the positioning satellites.

As described above, in addition to the distribution of positioning satellite (DOP), the ranging accuracy $e_i$ is used in the calculation of the first estimated deviation Δx. This allows a positioning accuracy to be estimated in consideration of not only the distribution of positioning satellites but also the impact of the strength of radiowaves received from each of the positioning satellites. This allows the satellite radiowave receiving unit 50 to evaluate the accuracy of the current position more properly and determine the necessity for resuming the acquiring operation.

The module processor 52 weights a variance in relative positions to the current positions of the positioning satellites with a ranging accuracy $e_i$ to calculate the first estimated deviation Δx. The ranging accuracy corresponding to the SNR of each positioning satellite is reflected to determine the first estimated deviation Δx, as described above. This allows the satellite radiowave receiving unit 50 to obtain a quantitative error range more properly.

The module processor 52 calculates a travelling speed of the electronic timepiece 1 (the satellite radiowave receiving unit 50) based on the results of the past positioning operations and calculates the position as a new predicted position pf in the case where the electronic timepiece 1 travelled from the last calculated position at the calculated travelling speed. This allows the satellite radiowave receiving unit 50 to quantitatively evaluate a presumed error range ε properly based on the SNR and to determine the necessity for resuming the acquiring operation.

The electronic timepiece 1 according to this embodiment includes the satellite radiowave receiving unit 50 (which may include the ROM 63), the timing circuit 47 counting time and date, and the display 62 that can display time and date counted by the timing circuit 47.

This configuration allows the electronic timepiece 1 to determine the necessity for resuming the acquiring operation based on the accuracy of the results of the positioning operation. This is significantly useful for a portable electronic timepiece, whose current position varies as the user travels, because it allows the electronic timepiece 1 to determine the necessity for resuming the acquiring operation while avoiding excessive acquiring operations and continuously maintaining a required accuracy. This can prevent an increase in power consumption, maintain a stable positioning accuracy effectively, and prevent an erroneous setting of a local time due to erroneous determination of the current position.

The method of controlling the positioning according to this embodiment includes a positioning calculating step, an acquisition stopping step, and an acquisition resuming step. The positioning calculating step involves positioning operations based on radiowaves received by the receiver 51 and obtaining of the current position of the electronic timepiece 1. The acquisition stopping step involves causing the receiver 51 to stop acquiring radiowaves from a new positioning satellite after the elapse of eight seconds from the start of the acquiring operation while radiowaves are acquired from a required number of positioning satellites for positioning operations. The acquisition resuming step involves causing the receiver 51 to resume the acquiring operation if an error range of the obtained current position no longer satisfies a predetermined accuracy standard during stop of the acquiring operation.

The electronic timepiece 1 according to this embodiment determines the necessity for resuming the acquiring operation based on the positioning accuracy, as described above. The method of controlling the positioning enables to perform positioning operations efficiently without a significant increase in power consumption more than necessary by performing minimum necessary number of acquiring operations. The satellite radiowave receiving unit 50 can continue to perform high-accuracy positioning operations effectively.

The programs 631 that perform the method of controlling the positioning are installed and executed in a computer. This readily allows the module processor 52 to perform determination process of a positioning accuracy and to determine the necessity for resuming the acquiring operation flexibly so that a required accuracy can be maintained. This allows the electronic timepiece 1 to continuously obtain stable and accurate current position data.

The present invention should not be limited to the above embodiment and various modifications can be made.

For example, in the above embodiment, the predetermined accuracy standard indicating a positioning accuracy (an error range) is the presumed error range ε which is a larger one of the first estimated deviation Δx and the second estimated deviation Δp. Alternatively, the predetermined accuracy standard may be any one of the first estimated deviation Δx and the second estimated deviation Δp, depending on the kinetic state of the electronic timepiece 1. Alternatively, the predetermined accuracy standard may be a value other than the first estimated deviation Δx and the second estimated deviation Δp. For example, the predetermined accuracy standard may be a conventional DOP value, a value in the longitudinal direction of an error range (error ellipse) in the GST message format (Pseudorange Noise Statistics) in NMEA-0183, or a larger one of a standard deviation for latitude errors and a standard deviation for longitude errors obtained according to the error range. The method for estimating a predicted position for the second estimated deviation Δp may be different from that described for the above embodiment. In the estimation of a predicted position, the distribution of positioning satellites for the first estimated deviation Δx or the receiving strength may be considered. Alternatively, the first estimated deviation Δx may be weighted in accordance with a deviation from a predicted position in the calculation of the first estimated deviation Δx. The error range in three axis directions may be calculated from offsets set for these directions, instead of the weighting in accordance with the strength of radiowaves received from each positioning satellite.

In the case of use of both the first estimated deviation Δx and the second estimated deviation Δp, the average thereof may be used, instead of mere use of a larger value. Alternatively, the average may be weighted in accordance with the kinetic state of the electronic timepiece 1, in particular, a variation in acceleration. The variation in acceleration may be detected with reference to not only the results of positioning operations but also measurements of an acceleration sensor separately provided.

The stop of the acquiring operation may be also determined based on the presumed error range ε, not just based on a simple time restriction. In this case, the stop of the acquiring operation may be determined based on the number of positioning satellites from which radiowaves are acquired.

In the above embodiment, the acquiring operation is resumed when a low-accuracy periods lasts for 52 seconds in total or continuously in the first reference period (for example, two minutes), which is an accuracy standard. Alternatively, the number of positioning operations with a low accuracy is cumulated, and the acquiring operation may be resumed when the cumulative number exceeds a predetermined number. Alternatively, the cumulative number may be replaced with the average of presumed error ranges ε in each first reference period or the moving average of presumed error ranges ε in the last first reference period may be compared with the reference Rth to determine the necessity for resuming the acquiring operation.

The same criteria may be applied for determining the necessity for resuming the acquiring operation in the case of a reduction in positioning accuracy as in the case of a failure to obtain the current position. The failure to obtain the current position may be determined to be equivalent to an infinite presumed error range ε.

In the above embodiment, the positioning controlling operation of the satellite radiowaves receiving unit 50 in the electronic timepiece 1 is described. Alternatively, the satellite radiowaves receiving unit 50 may be provided in various electronic devices other than the electronic timepiece 1. Alternatively, the satellite radiowaves receiving unit 50 may be a single module for receiving satellite radiowaves installed in the electronic device. Radiowaves may be received from any positioning satellites. Radiowaves from positioning satellites in several global positioning systems or those from regional positioning satellites, which supplement the functions of the global positioning systems, may be present at the same time.

In the above description, the programs 631 for controlling the receipt of radiowaves from positioning satellites according to the present invention at the time of obtaining current date and time information are stored in a computer-readable storage device (recording medium), such as a nonvolatile memory, including a flash memory, and the ROM 63, including a mask ROM, though not limitative in any way. Any other type of computer-readable recording medium may be used, for example, a portable recording medium, such as hard disk drive (HDD), CD-ROM, and DVD disk. The present invention is also applicable to carrier waves, a medium which provides the programs according to the present invention with data via a communication line.

It should be understood that the details of the configurations, control procedures, and display examples shown in the above embodiment can be appropriately modified without departing from the scope of the present invention.

The embodiments described above should not be construed to limit the present invention, and the claims and other equivalents thereof are included in the scope of the invention.

The subject application claims priority to Japanese Patent Application No. 2017-183186, filed on Sep. 25, 2017. The disclosure of Japanese Patent Application No. 2017-183186 is incorporated by reference herein.

What is claimed is:

1. A satellite radiowave receiving device, comprising:
a receiver acquiring and receiving radiowaves from a positioning satellite; and
a processor performing a positioning operation based on the radiowaves received by the receiver to obtain a current position of the satellite radiowave receiving device,
wherein the processor causes the receiver to stop an acquiring operation of radiowaves from a new positioning satellite under a predetermined condition while radiowaves are being acquired from a required number of positioning satellites for the positioning operation,
wherein if an error range of the obtained current position no longer satisfies a predetermined accuracy standard during a stop of the acquiring operation, the processor causes the receiver to resume the acquiring operation, and
wherein the processor calculates the error range at the current position based on a positioning accuracy and on a deviation of the obtained current position and a predicted position calculated in accordance with a travelling state of the satellite radiowave receiving device, the positioning accuracy being obtained by combining each position of positioning satellites from which radiowaves are received and each receiving state of the radiowaves.

2. The satellite radiowave receiving device according to claim 1,
wherein the processor respectively calculates a first error range for the positioning accuracy and a second error range for the deviation of the current position and the predicted position, and
wherein the processor calculates an error range of the current position based on the first error range and the second error range.

3. The satellite radiowave receiving device according to claim 2,
wherein the processor determines a larger one of the first error range and the second error range as the error range of the current position.

4. The satellite radiowave receiving device according to claim 3,
further comprising a memory storing a correspondence relation between strength of radiowaves received from the positioning satellite and a ranging accuracy of the positioning satellite in accordance with the strength of received radiowaves,
wherein the processor calculates the first error range based on a combination of a relative position relative to the current position of each of a plurality of positioning satellites used for calculating current position and the ranging accuracy inaccordance with strength of radiowaves received from each of the plurality of positioning satellites.

5. The satellite radiowave receiving device according to claim 2,
further comprising a memory storing a correspondence relation between strength of radiowaves received from the positioning satellite and a ranging accuracy of the positioning satellite in accordance with the strength of received radiowaves,
wherein the processor calculates the first error range based on a combination of a relative position relative to the current position of each of a plurality of positioning satellites used for calculating current position and the ranging accuracy in accordance with strength of radiowaves received from each of the plurality of positioning satellites.

6. The satellite radiowave receiving device according to claim 5,
wherein the processor weights a variance in the relative position relative to the current position of each of the plurality of positioning satellites using the ranging accuracy and calculates the first error range.

7. The satellite radiowave receiving device according to claim 2,
wherein the processor calculates a traveling speed of the satellite radiowave receiving device based on a result of past positioning operation, and calculates a new predicted position which is a position of the satellite radiowave receiving device when travelled from the last calculated position at the calculated travelling speed.

8. The satellite radiowave receiving device according to claim 1,
wherein the processor calculates a traveling speed of the satellite radiowave receiving device based on a result of past positioning operation, and calculates a new predicted position which is a position of the satellite radiowave receiving device when travelled from the last calculated position at the calculated travelling speed.

9. An electronic timepiece comprising:
the satellite radiowave receiving device according to claim 1;
a timing circuit configured to count date and time; and
a display configured to display the date and time counted by the timing circuit.

10. The satellite radiowave receiving device according to claim 1,
wherein the processor causes the receiver to resume the acquiring operation if a rate of a low-accuracy period in a first reference period is equal to or greater than a predetermined first rate so that the accuracy standard is not satisfied, the low-accuracy period being a period in which the error range is greater than a reference.

11. The satellite radiowave receiving device according to claim 10,
wherein the processor respectively calculates a first error range for the positioning accuracy and a second error range for the deviation of the current position and the predicted position, and
wherein the processor calculates an error range of the current position based on the first error range and the second error range.

12. The satellite radiowave receiving device according to claim 11,
wherein the processor determines a larger one of the first error range and the second error range as the error range of the current position.

13. A satellite radiowave receiving device, comprising:
a receiver acquiring and receiving radiowaves from a positioning satellite; and
a processor performing a positioning operation based on the radiowaves received by the receiver to obtain a current position of the satellite radiowave receiving device,
wherein the processor causes the receiver to stop an acquiring operation of radiowaves from a new positioning satellite under a predetermined condition while radiowaves are being acquired from a required number of positioning satellites for the positioning operation,
wherein if an error range of the obtained current position no longer satisfies a predetermined accuracy standard during a stop of the acquiring operation, the processor causes the receiver to resume the acquiring operation,
wherein the processor causes the receiver to resume the acquiring operation if a rate of a low-accuracy period in a first reference period is equal to or greater than a predetermined first rate so that the accuracy standard is not satisfied, the low-accuracy period being a period in which the error range is greater than a reference, and
wherein the processor causes the receiver to resume the acquiring operation if a rate of failure to obtain current position in the first reference period is equal to or greater than a second rate which is less than the first rate.

14. The satellite radiowave receiving device according to claim 13,
wherein the processor calculates the error range at the current position based on a positioning accuracy and on a deviation of the obtained current position and a predicted position calculated in accordance with a travelling state of the satellite radiowave receiving device, the positioning accuracy being obtained by combining each position of positioning satellites from which radiowaves are received and each receiving state of the radiowaves.

15. The satellite radiowave receiving device according to claim 14,
wherein the processor respectively calculates a first error range for the positioning accuracy and a second error range for the deviation of the current position and the predicted position, and
wherein the processor calculates an error range of the current position based on the first error range and the second error range.

16. The satellite radiowave receiving device according to claim 15,
wherein the processor determines a larger one of the first error range and the second error range as the error range of the current position.

17. A method of controlling the positioning of a satellite radiowave receiving device including a receiver acquiring and receiving radiowaves from a positioning satellite, the method comprising:
performing a positioning operation based on the radiowaves received by the receiver to obtain a current position of the satellite radiowave receiving device;
causing the receiver to stop an acquiring operation of radiowaves from a new positioning satellite under a predetermined condition while radiowaves are being acquired from a required number of positioning satellite for the positioning operation;
if an error range of the obtained current position no longer satisfies a predetermined accuracy standard during a stop of the acquiring operation, causing the receiver to resume the acquiring operation; and
calculating the error range at the current position based on a positioning accuracy and on a deviation of the obtained current position and a predicted position calculated in accordance with a travelling state of the satellite radiowave receiving device, the positioning accuracy being obtained by combining each position of positioning satellites from which radiowaves are received and each receiving state of the radiowaves.

18. A non-transitory computer readable storage device storing a program readable by a computer in a satellite radiowave receiving device including a receiver acquiring and receiving radiowaves from a positioning satellite, the program causing the computer to:
perform a positioning operation based on the radiowaves received by the receiver to obtain a current position of the satellite radiowave receiving device;
cause the receiver to stop an acquiring operation of radiowaves from a new positioning satellite under a predetermined condition while radiowaves are being acquired from a required number of positioning satellite for the positioning operation;
if an error range of the obtained current position no longer satisfies a predetermined accuracy standard during a stop of the acquiring operation, cause the receiver to resume the acquiring operation; and
calculate the error range at the current position based on a positioning accuracy and on a deviation of the obtained current position and a predicted position calculated in accordance with a travelling state of the satellite radiowave receiving device, the positioning accuracy being obtained by combining each position of positioning satellites from which radiowaves are received and each receiving state of the radiowaves.

* * * * *